UNITED STATES PATENT OFFICE.

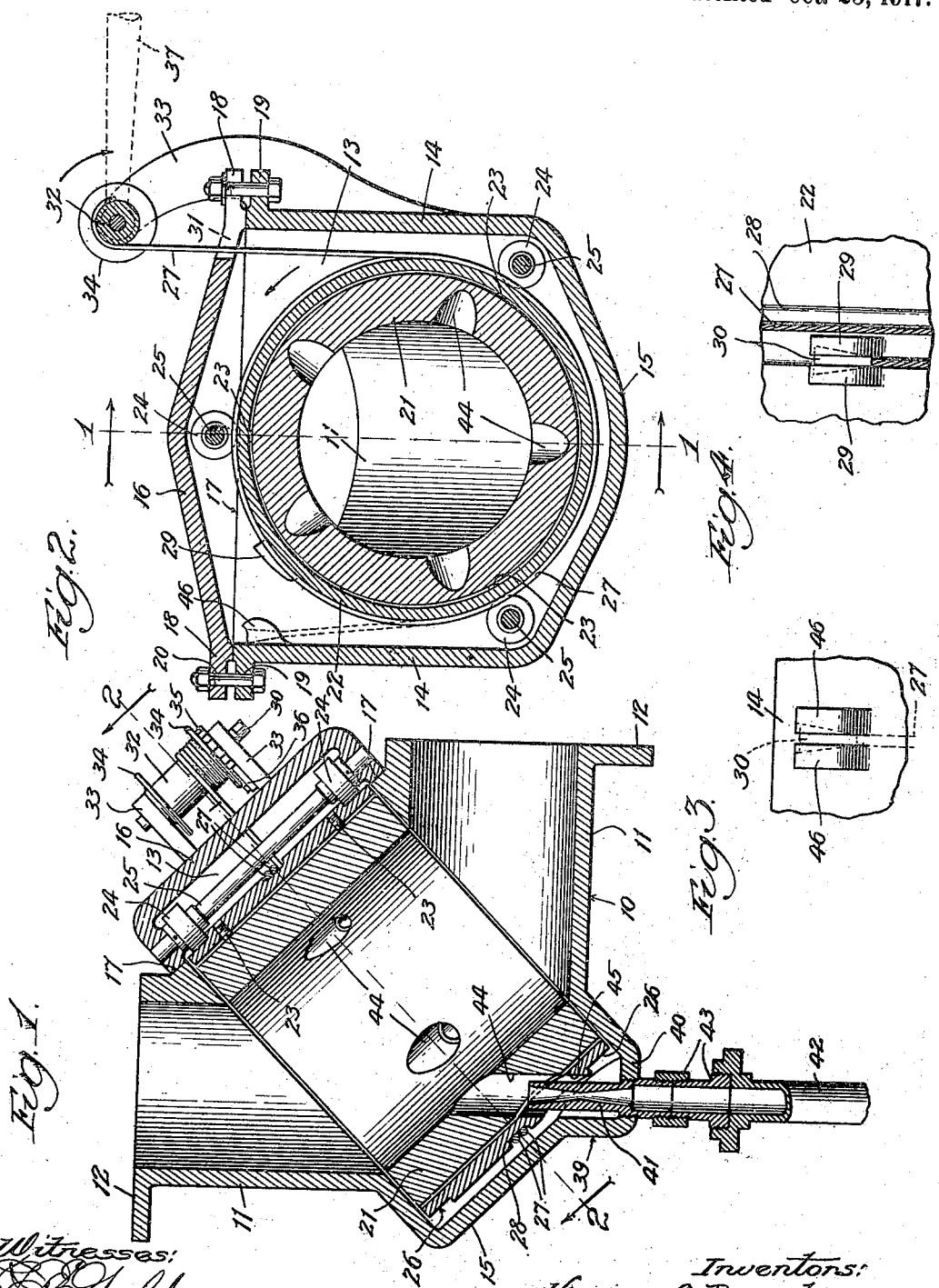

HERMAN A. POPPENHUSEN, OF HAMMOND, INDIANA, AND ARTHUR P. STRONG, OF CHICAGO, ILLINOIS, ASSIGNORS TO GREEN ENGINEERING COMPANY, OF EAST CHICAGO, INDIANA, A CORPORATION OF ILLINOIS.

ELBOW-FITTING.

1,243,874.            Specification of Letters Patent.            Patented Oct. 23, 1917.

Application filed January 8, 1917. Serial No. 141,302.

*To all whom it may concern:*

Be it known that we, HERMAN A. POPPENHUSEN, a citizen of the United States, residing at Hammond, in the county of Lake and State of Indiana, and ARTHUR P. STRONG, a citizen of the United States, residing at Chicago, in the county of Cook and State of Illinois, have invented new and useful Improvements in Elbow-Fittings, of which the following is a specification.

This invention relates to improvements in elbow or pipe connecting fittings, for use in pneumatic conveying systems for the handling and disposal of ashes or other materials of an abrasive character.

In systems of this character, pipe lines or conduits are employed for conducting the material, there being usually one or more turns or bends throughout the length of a conduit, at which points an elbow or like fitting is used, as is common to all pipe line constructions. On account of the character of the material handled in the conduits, the abrasive action or wear upon the inner surface of the pipes and elbow fittings is considerable, and particularly so upon the latter, inasmuch as they are located at the points where the direction of flow of the ashes is abruptly changed, hence portions of such fittings are subjected to an excessive degree of wear. For this reason, the fittings at the bends or turns are preferably provided with members known as wearing backs or "wear sections" made of a harder metal, and removably mounted within the fitting and extending throughout the portions of the inner surface of the fittings which receive the excessive wear, these wearing backs or sections being renewed from time to time, without disturbing or replacing the fitting itself.

It is to a fitting of this character that the present invention relates, the novel features including a form of wear section having a number of surfaces which may be successively moved into position to receive the abrasive action of the material, until all the surfaces have been exhausted, whereupon a new section may be inserted. Other novel features include the means for moving or actuating the wearing sections and for removing them from the fitting.

The novel features indicated are hereinafter more fully described and illustrated in the accompanying drawings, wherein—

Figure 1 is a view in longitudinal section taken through a fitting embodying the features of the invention;

Fig. 2 is a cross-sectional view of the fitting taken on line 2—2 of Fig. 1;

Fig. 3 is an enlarged detail view of the retaining lugs on the casing of the fitting for removably connecting the end of the drum-actuating cable thereto; and Fig. 4 is an enlarged view of a similar arrangement of lugs upon the rotative drum for removably attaching the actuating cable thereto.

The improved fitting embodying the features of the invention comprises a cast-metal casing 10, having a curved longitudinal passage therethrough, the end portions of the fitting being tubular and forming the intake and discharge passages, arranged at an angle of 90° to each other. At the open ends of the passage are provided flanges 12, 12, adapted to connect the fitting with the ends of the straight pipes joined thereby.

To provide for the reception of the wear section, hereinafter described, the central portion of the casing is considerably enlarged in diameter, to provide a cavity or chamber 13 intermediate the end portions 11, 11. Although the particular shape of the cavity is immaterial, the walls surrounding the cavity are spaced outwardly in all directions from the longitudinal passage and are preferably arranged to present a somewhat hexagonal appearance in cross-sectional contour, as shown in Fig. 2, the upright or side walls 14, 14 being parallel with each other and of considerable length as compared with the intermediate top and bottom walls, the bottom wall 15 sloping downwardly from the adjacent ends of the side walls and meeting in a gently rounded central portion. The top walls 16, which is in fact a removable cover or plate, has a shape or sectional contour corresponding to that of the bottom wall, the same extending over a substantially rectangular opening at the upper end of the side walls 14, 14, or, with relation to the fitting, an opening formed in the "throat" or shortest portion of the passage between the ends of the fitting. The cover or top 16 bears against the margins of the side walls 14, 14 and transverse bearing surfaces 17, 17 (Fig. 1) formed adjacent to the end flanges 12, 12, and is connected to the casing by the provision of outwardly extending marginal lugs 18, 18 integral with said cover, and corresponding lugs 19, 19 integral with the casing and formed at suitable intervals along the upper margins of the side walls 14, 14 of the cavity 13. A bolt 20 extends through each pair of corresponding lugs 18 and 19, connecting the parts together in the usual manner.

Within the cavity 13 of the casing is mounted the wear section, the following arrangement of parts being preferably employed: The wear section 21 consists of an annular ring of a metal preferably harder than the metal of the casing and of a thickness somewhat greater than the normal thickness of the walls of the casing. The ring is rotatably mounted, as will presently be seen, concentrically within the cavity and at an angle of 45° to each of the end portions 11, 11 of the casing, the central passage or opening through the ring, or wear section being greater in diameter than the normal diameter of the passage, as established by the diameter of the inlet and discharge passages of said end portions 11, 11. The said end portions, however, intersect the cavity at such an angle that the openings formed by such intersections register with the central opening of the wear section, thus forming a smooth and uniform junction of the surfaces.

Surrounding the wear section 21 is a liner or drum 22, also in the form of an annular ring, though of less thickness and preferably more accurately formed or machined, inasmuch as it is a permanent part of the fitting. The drum 22 completely surrounds the wear section, and is non-rotatively secured thereto by means of a suitable arrangement of set screws 23, which serve to connect the parts together and to permit the necessary adjustment to secure the concentricity of the wear section, with respect to the central passage.

The drum and wear section are rotatively mounted within the cavity by the following arrangement of members: Mounted within the cavity at about the periphery of the drum 22 are a plurality of pairs of rollers 24, 24, which are rotatively mounted on shafts 25 extending transversely of the cavity and mounted at their ends in the end walls of the cavity and the cover plate 16, as shown in Fig. 1. The shafts are arranged in spaced relation about the periphery of the drum, there being shown three of such shafts, arranged in angular relation of 120° apart, two of said shafts being located adjacent to the lower ends of the side walls 14, and the third intermediate the side margins of the cover 16. Two rollers 24, 24 are located on each shaft adjacent to the ends thereof, and engage the outer surface of the drum 22 at the margins thereof, there being preferably provided in the outer surface of said drum marginal grooves or tracks 26, in which the rollers 24 travel.

It is now obvious that the ring, together with its supporting drum are free to rotate within the casing by reason of the rolling engagement between the rollers 24 and the drum. In order that the parts may be rotated conveniently and without removing the cover 16, the following construction is employed: Surrounding the drum is a cable 27 of wire or other suitable material, which is retained within a shallow groove 28 formed in the surface of the drum, midway between its end margins. For reasons that will presently be pointed out the drum is surrounded by at least two turns of the cable (the groove 28 being sufficiently wide to accommodate that number), one end of the cable being removably attached to the drum in any suitable manner, such as the provision of retaining lugs 29, 29 (Fig. 4) formed integral with the drum adjacent to the groove 28, said lugs being spaced apart a distance sufficient to permit the cable to be inserted between them, and having the inner opposed surfaces so grooved and tapered as to form a tapered socket. The end of the cable is provided with an enlarged extremity 30, preferably wedge-shaped and adapted to engage the socket formed by the lugs 29, 29. In this manner the end of the cable is secured to the drum, but can be detached by loosening or unwrapping the cable a sufficient amount. The cable, then surrounding the drum with at least two turns as before suggested, leaves the drum from one side thereof and extends upwardly parallel to one of the side walls 14, as shown in Fig. 2, through the cover plate 16, which is provided with a slot 31 extending inwardly from the margin for that purpose. The free end of the cable is connected to a winch or cylindric barrel 32, rotatively mounted above the cover plate, between the supporting arms 33 integral with the casing and more particularly with the side wall 14 of the cavity 13. The winch 32 is of sufficient length and diameter to accommodate numerous turns of the cable, and provided with the usual retaining flanges 34, 34 at the ends thereof, together with a series of ratchet teeth 35 at one end, adapted to be engaged by a retaining dog or pawl 36 mounted on the adjacent supporting arm 33. The ratchet teeth and pawl are provided for the usual purpose of limiting the rotation of the winch to one direction, namely, the direction to wind the cable onto the winch and likewise hold the winch in stationary position. For the purpose of rotating the winch, a lever 37 is employed, which engages the extremity 38 of the supporting shaft of the drum beyond one of the supporting arms, said extremity having a square head, to be engaged by a similarly shaped aperture of the lever.

Referring now to the steam jet and the connections therefor, there is provided in the lower portion of the bottom wall 15 of the cavity an offset or irregularly formed wall portion 39 adjacent to the lower or inlet side of the cavity (considering the inlet end of the fitting as the horizontal end portion 11, and the discharge end as the vertical end portion 11), said offset portion being shaped to provide a wall 40 extending transversely of the central axis of the discharge end 11 of the casing and in the path of said axis. Within this wall is mounted a steam nozzle 41, having a suitably formed central passage or orifice, said nozzle extending into the cavity 13 a short distance and in axial alinement with the discharge passage or end portion 11. The nozzle has screw-threaded engagement with an aperture in the wall 40 and likewise with a steam supply pipe 42 by means of suitably screw-threaded connecting members 43.

In order that the steam nozzle may inject a steam jet into the vertical passage of the fitting, there are provided in the drum 22 and the wearing ring 21 a series of openings or passages 44 and 45, respectively, said openings registering with each other. These apertures are located substantially centrally of the drum and wear-ring, and are spaced apart in concentric relation throughout the circumference of said drum and ring. Furthermore, these passages are formed at an inclination to the annular surfaces of the drum and ring, namely, at an angle of 45° thereto, so that each passage when brought to a position to register with the nozzle will be in axial alinement with the discharge opening of the fitting. As a desired arrangement, the passages 44 and 45 are preferably five in number, spaced apart at angles of 75° about the drum and ring, said passages being adapted to be brought successively into a position in alinement with the discharge opening of the fitting and to register with the nozzle 41, said nozzle preferably projecting a short distance into the passages 44 and 45 but terminating short of the inner surface of the wear-ring 21.

In describing the manner in which the fitting is manipulated, it is first to be observed that the entire inner surface of the wear section is not subjected simultaneously to the abrasive action of the material, but only a portion of the area, namely, the area adjacent to and on either side of each passage or steam jet opening, this being due to the fact that the ashes do not completely fill the passage, but, because of the action of gravity and the momentum of the mass, the material contacts only with the lower or outer surfaces in the path of movment. Thus after a continual operation of the fitting the metal of the ring is worn through the area adjacent to the steam-jet passage then registering with the steam jet, the remaining area being practically unharmed. Now, after one area has become worn, a new one can be provided by rotating the drum and ring through one-fifth of a revolution, thus bringing the next steam jet passage into registering relation with the steam nozzle, which can be easily removed while the alteration is being made. Thus the ring in a single revolution is capable of providing or presenting a plurality of wearing surfaces, before it is worn out completely and a new one need be inserted.

Assuming that a new wearing ring has been placed in the fitting, the cable 27 is coiled about the drum twice and its end secured to the lugs 29, 29. Now, if it is desired to replace the present wearing surface by a new one, the lever 37 would be rotated in a clockwise direction, thereby winding the cable onto the winch, simultaneously unwinding the cable from the drum and rotating the drum and wearing ring in a counter-clockwise direction until the adjacent steam passage comes into registering relation with the nozzle position, the nozzle being inserted after the wear-ring has been adjusted. Thus, the ring may be advanced until all the surfaces have been used and a complete revolution of the ring effected.

In order to insert a new wear-ring, the same, together with the drum, must be removed from the casing. Inasmuch as the parts to be removed are ordinarily heavy and difficult to handle, it is proposed to employ the cable and winch for this purpose, as will be understood from the following. Bearing in mind that the cable surrounded the drum twice before the drum was rotated, it is manifest that after the drum has been rotated through a single revolution, there still remains about the drum a single turn of the cable, the end of the cable being preferably positioned upon the upper surface of the drum, so that it is accessible upon removing the cover 16. Adjacent to the upper margin of the cavity 13 and formed integral with the inner surface of the side wall 14 and on the opposite side of the drum from the winch and lever, are provided the lugs 46, 46, vertically arranged and spaced apart in the same manner as the lugs 29, 29 on the drum, and formed to provide a socket adapted to receive the enlarged end 30 of the cable. Now, if the end of the cable is detached from the drum and connected to the casing by means of the lugs 46, 46, the cable now becomes a sling extending below and around the bottom of the drum. Again rotating the winch, in the same direction as before, the cable is gradually shortened, thereby raising or lifting the drum and wear-ring out of the casing. By the same means the drum with a new ring can be lowered into the casing, whereupon the cable is again attached to the drum, the cover replaced, and the device ready to be rotated when conditions demand.

A fitting constructed in accordance with the foregoing description provides a novel and useful arrangement for renewing the wear-resisting surface, by the use of a single annular ring capable of presenting a plurality of surfaces, thereby avoiding the operation of replacing separate wear sections, manifestly saving considerable labor and loss of time as well as the cost and amount of metal used in supplying the fitting with these wear-resisting surfaces. Furthermore, the convenient method employed in manipulating the wear section and in removing it from the fitting materially decreases the cost and labor in maintaining a system in proper operating condition.

As illustrated and described, the fitting is of that kind used in a so-called steam jet type of conveying systems, wherein a series of steam jets are located along the conduit, and preferably at the bends and turns, for the purpose of providing the necessary medium or force for moving the material through the conduit. The features of the invention are, however, not confined to a fitting including a steam jet nozzle as a part thereof, inasmuch as the same results would be accomplished by the elimination of the steam jet and passages therefor.

We claim as our invention:

1. A pipe connecting fitting, comprising a casing having a longitudinal passage, and an annular wear section rotatively mounted in said passage, and means for rotating said wear section.

2. A pipe connecting fitting, comprising a casing having a longitudinal passage therethrough, an annular wear section rotatively mounted in said casing, and an antifriction bearing engaging said wear section.

3. A pipe connecting fitting, comprising a casing provided with a longitudinal passage, an annular wear section rotatively mounted in said casing and in concentric relation with the passage, and means for rotating said wear section from the exterior of said casing and for removing it bodily therefrom.

4. A pipe connecting fitting, comprising a casing having a longitudinal passage therethrough and an enlarged cavity intermediate its ends, an annular wear section rotatively mounted within said cavity and in registering relation with said passage, and means for rotating said wear section from the exterior of said casing.

5. A pipe connecting fitting, comprising a casing having a passage and an enlarged cavity intermediate the ends of said casing, a wear section comprising an annular metal ring mounted in said cavity in registering relation with said passage, rollers journaled within said cavity engaging and rotatively supporting said wear section, and means for rotating said wear section from the exterior of said casing.

6. A pipe connecting fitting, comprising a casing having a passage and an enlarged cavity intermediate the ends of said casing, a removable cover normally closing an opening in said casing communicating with said cavity, a wear section comprising an annular metal ring mounted in said cavity in registering relation with said passage, rollers journaled within said cavity, engaging and rotatively supporting said wear section, and means for rotating said wear section from the exterior of said casing.

7. A pipe connecting fitting, comprising a casing having a longitudinal passage, the walls of said casing being extended laterally throughout a portion of its length to provide an enlarged cavity surrounding said passage, said cavity being provided with a removable wall section, a wear section having the form of an annular metal ring rotatively supported within said cavity, a series of rollers, journaled in said cavity and rotatively supporting said wear section in concentric relation with said passage, and means for rotating said wear section from the exterior of said casing.

8. A pipe connecting fitting, comprising a casing having a longitudinal passage and a centrally disposed cavity surrounding said passage, a wear resisting member mounted in said cavity and comprising an annular ring of hard metal, having an annular passage disposed concentrically to the passage of the casing, an annular drum surrounding said ring and detachably connected thereto, a plurality of rollers journaled in said casing and rotatively supporting said drum and ring, and means for rotating said wear resisting member.

9. A pipe connecting fitting, comprising a casing having a longitudinal passage, a wear section comprising an annular ring rotatively mounted in concentric relation with said passage, a flexible member surrounding said ring and attached at one end thereto, and means for exerting force on the other end of the flexible member to rotate the wear section.

10. A pipe connecting fitting, comprising a casing having a longitudinal passage and an enlarged cavity intermediate its ends, a wear section comprising an annular ring mounted in said cavity and adapted to be revolved concentrically with said passage, a flexible member surrounding said ring and attached at one end thereto, the free end of said flexible member extending exterior of the casing, and means for exerting force on said free end of the flexible member to rotate the wear section.

11. A pipe connecting fitting, comprising a casing having a longitudinal passage and an enlarged cavity intermediate its ends, a wear section comprising an annular ring mounted in said cavity and adapted to be revolved concentrically with said passage, a cable surrounding said wear section and secured at one end thereto, and a winch mounted exterior of said casing and engaging the free end of said cable.

12. A pipe connecting fitting, comprising a casing having a longitudinal passage and a cavity provided with an opening in the wall thereof, a wear section comprising an annular ring rotatively mounted in said casing, a cable passing around said wear section and secured at one end to said casing on one side of the wear section, and a winch mounted on the opposite side of the wear section and connected to the free end of the cable.

13. A pipe connecting fitting, comprising a casing having a longitudinal passage and an enlarged cavity extending through a portion of the length of said passage, said casing having a removable cover extending over an opening in the wall of said cavity, a wear section comprising an annular member rotatively mounted in said cavity concentrically with said passage, a cable adapted to surround said wear section at least twice and adapted to have detachable connection at one end with said wear section or with said casing, and a winch mounted adjacent said opening, exterior to said casing, and engaging the free end of the cable.

14. A pipe connecting fitting, comprising a casing having a longitudinal passage and an enlarged cavity extending through a portion of the length of said passage, said casing having a removable cover extending over an opening to said cavity, a wear section comprising a ring rotatively mounted in said cavity concentrically with said passage, a cable surrounding said wear section at least twice and detachably connected at one end thereto, and an actuating member connected with the free end of said cable for rotating said wear section, and located adjacent said opening in the casing, said cable being capable of detachment from said wear section and attachment to said casing, to effect the lifting of the wear section from the casing, through the medium of the cable and actuating member.

15. A pipe connecting fitting, comprising a casing having a longitudinal passage, an opening in the wall of the casing, a cover normally closing said opening, a wear section having the form of an annular metal ring rotatively supported within said casing and removable therefrom through said opening, and means for rotating said wear section and removing the same from the casing, comprising a cable surrounding said wear section with at least two turns, the end of said cable having detachable connection with said wear section, a winch engaging the free end of said cable and located adjacent one side of said opening, and means located on the opposite side of said opening for detachably connecting the end of the cable to said casing, said winch being operable to rotate said wear section in the unwinding of a turn of the cable therefrom, and to lift said wear section from the casing when the end of the cable is connected to the casing and the remaining portion of the cable passes beneath the wear section.

In testimony that we claim the foregoing as our invention we affix our signatures in the presence of two witnesses, this 19th day of December, A. D. 1916.

HERMAN A. POPPENHUSEN.
ARTHUR P. STRONG.

Witnesses:
H. R. WILSON,
A. S. BRADY.